United States Patent [19]

Greenham et al.

[11] Patent Number: 4,936,889
[45] Date of Patent: Jun. 26, 1990

[54] APPARATUS FOR THE MANUFACTURE OF OPTICAL FIBRE PREFORMS

[75] Inventors: Adrian C. Greenham, Harrow; Bruce A. Nichols, Wembley; Tin M. Ong, Greenford, all of England

[73] Assignee: The General Electric Company, p.l.c., England

[21] Appl. No.: 246,859

[22] Filed: Sep. 20, 1988

[30] Foreign Application Priority Data

Sep. 25, 1987 [GB] United Kingdom ............... 8722631

[51] Int. Cl.$^5$ ........................................... C03B 37/018
[52] U.S. Cl. ......................................... 65/1; 65/3.12; 65/13; 118/726; 427/166
[58] Field of Search ............... 65/1, 3.11, 3.12, 12, 65/13; 427/166; 118/726

[56] References Cited

U.S. PATENT DOCUMENTS

| 4,314,837 | 2/1982 | Blankenship | 65/13 |
| 4,529,427 | 7/1985 | French | 65/3.12 |
| 4,597,787 | 7/1986 | Jacobson | 65/3.12 |

FOREIGN PATENT DOCUMENTS

| 2093829 | 9/1982 | United Kingdom . |
| 2134099 | 8/1984 | United Kingdom . |
| 2149779 | 6/1985 | United Kingdom . |
| 2151609 | 7/1985 | United Kingdom . |
| 2180832 | 4/1987 | United Kingdom . |
| WO8607347 | 12/1986 | World Int. Prop. O. . |
| WO8701110 | 2/1987 | World Int. Prop. O. . |

OTHER PUBLICATIONS

Electronics Letters, Aug. 15, 1985, vol. 21, No. 17, "Fabrication of Low-Loss Optical Fibres Containing Rare-Earth Ions", S. B. Poole, et al, pp. 737-738.

Primary Examiner—Peter Kratz
Attorney, Agent, or Firm—Kirschstein, Ottinger, Israel & Schiffmiller

[57] ABSTRACT

In apparatus for carrying out a method of manufacturing optical fibre preforms by causing a chemical reaction to take place in a gaseous reaction mixture so as to form a coating on a glass substrate wherein the reaction is promoted by the production of a plasma, a non-volatile component of the reaction mixture is held within a dispenser tube so that when it is evaporated by applying heat, it travels through perforations in the dispenser tube and reacts with the other components of the gaseous mixture.

12 Claims, 3 Drawing Sheets

APPARATUS FOR THE MANUFACTURE OF OPTICAL FIBRE PREFORMS

BACKGROUND OF THE INVENTION

1. Field of the Invention

This invention relates to the manufacture of glass preforms, from which optical fibre waveguides can be produced by drawings using a vapour deposition process. Commonly, the method used is of the type (hereinafter referred to as "the type specified") in which a chemical reaction is caused to take place in a gaseous reaction mixture so as to form a coating on the inner surface of a glass tube wherein the reaction is promoted by the production of a plasma in the mixture.

2. Description of Related Art

Normally the gaseous reaction mixture consists of a carrier gas (usually oxygen) and volatile precursors (usually halides such as silicon tetrachloride). These may be introduced into the region of the tube in which the plasma is produced by way of a perforated central dispenser tube.

This particular method, and forms of the apparatus by which it may be carried out, are disclosed in U.K. Patent Application Nos. 2093829, 2134099 and 2151609, to which reference should be made for further details.

It is advantageous to dope preforms for fibre lasers and fibre amplifiers with rare earth elements. However, the rare earth halides are solids at room temperature and have low vapour pressures relative to silicon tetrachloride even when heated to high temperatures. For example, neodymium chloride has a vapour pressure of approximately 0.65 torr at 1000° C.

SUMMARY OF THE INVENTION

One object of this invention is to provide a method of manufacturing an optical fibre preform in which the preforms are doped with elements such as rare earths, for which there is no suitable volatile precursor.

Another object of this invention is to provide a method of manufacturing an optical fibre preform by a vapour deposition process in which the amount of vaporized substance deposited can be accurately determined.

According to one aspect of the invention, a method of manufacturing optical fibre preforms by means of a vapour deposition process comprises the steps of: introducing at least one dopant substance into at least one reservoir within a dispenser tube, heating the at least one substance to produce evaporation thereof, and causing the vapour of said at least one substance to flow through said dispenser tube into a reaction zone and, on reaction, forming a deposit on the interior wall of an optical fibre preform surrounding said reaction zone.

Conveniently the vapour deposition process is the plasma process of the type specified, and the vapour is introduced into the substrate tube by means of perforations in a region of the dispenser tube disposed coaxially within the substrate tube.

According to a further aspect of the invention, apparatus for the manufacture of optical fibre preforms by a vapour deposition process comprises a dispenser tube, which is perforated along a region adjacent one end and is adapted to contain at least one dopant substance in at least one reservoir spaced from said region, means for heating said dispenser tube capable of evaporating the at least one substance contained therein and causing the vapour so produced to pass along the tube and emerge from the perforations.

Conveniently means are provided for feeding a carrier gas, possibly with other reactant vapours, along the dispenser tube so as to carry the vapour of said at least one substance from the reservoir position and through the perforations.

Preferably, each substance is held in a reservoir which is a bulb formed in the non-perforated region of the tube. This region may be formed of two sections of glass tubing, the first section having a bulb which is open to receive the second section which protrudes into the bulb. Each substance is then held between the base of the bulb and the protruding bottom section of tubing.

A plurality of bulbs may be formed in series in the non-perforated region of the tube. In this way, the preform can be simultaneously doped with substances of differing vaporization temperatures by placing each dopant in a bulb whose temperature is sufficient to cause evaporation.

To prevent the evaporated substance condensing in the tubing, the dispenser tube is conveniently heated so that the temperature of the tube rises progressively from the bulb furthest from the perforated region to the perforated region.

If the temperature gradient along the tube is known, the temperature of each bulb can easily be determined from its position. From the relationship between the vapour pressure and the temperature, the rate of sublimation of each substance may be calculated. Hence, for a known flow and pressure of carrier gas, the amount of vaporised substance deposited can also be calculated and controlled by moving the bulb up or down the temperature gradient.

By moving the bulb along the temperature gradient during the formation of the preform, the concentration of dopant in different regions of the preform may be varied. If the bulb has a temperature which is sufficiently high to evaporate the dopant throughout the formation of the preform, both the cladding and the core will be doped. However, the bulb may be moved from a region on the temperature gradient where it is too cold for dopant evaporation (a 'cold' region) to one where it is sufficiently hot (a 'hot' region) during the process. Thus if the bulb is in a 'cold' region during the cladding deposition and in a 'hot' region during core deposition, the preform formed will have an undoped cladding and a doped core. Alternatively, the preform may be formed with an undoped core and a dopped cladding by moving the bulb from a 'hot' region during cladding deposition to a 'cold' region during core deposition.

Preferably, the whole of the perforated region is held at a uniform temperature so as to obtain a uniform deposited layer.

The substance used may be a rare earth halide such as neodymium chloride thus enabling preforms to be doped with rare earths.

BRIEF DESCRIPTION OF THE DRAWINGS

The method of the invention will now be further explained by way of example with reference to the accompanying drawings.

DETAILED DESCRIPTION OF THE PREFERRED EMBODIMENTS

Figure 1:
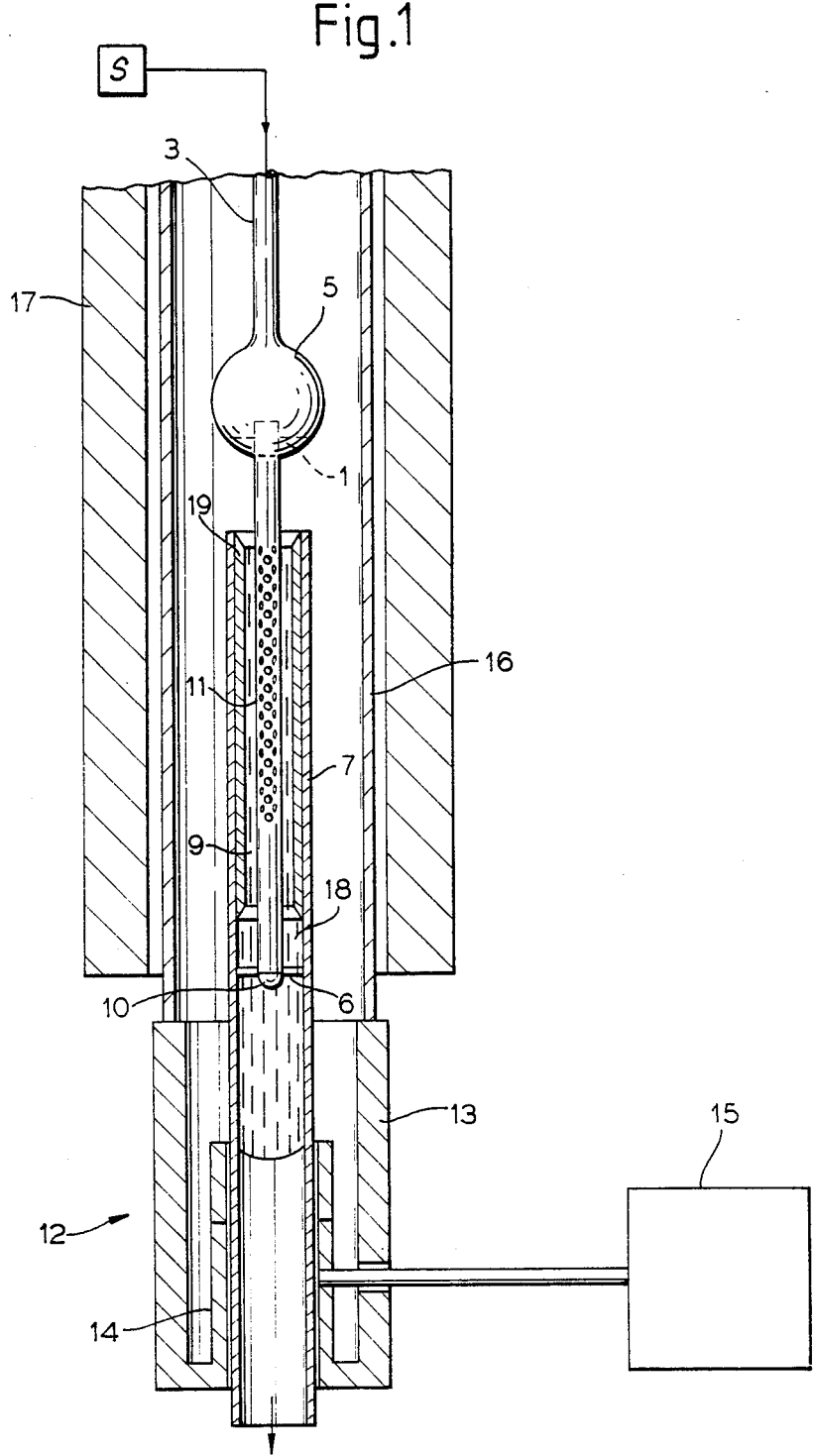
FIG. 1 shows one form of apparatus for manufacturing preforms schematically in accordance with the method of the invention.

Referring to FIG. 1, the upper end of the dispenser tube 3 is connected to means shown schematically at S for supplying a mixture of carrier gas and reactant vapour to the tube. The lower end 10 of the tube 3 is closed and the wall of the tube in that region is pierced by a multiplicity of perforations 11 to permit egress of the reactants and carrier gas into a space 9 within a surrounding substrate tube 7, which space constitutes a reaction zone.

A microwave cavity 12 formed of an outer cylinder 13 and an inner cylinder 14 is located adjacent to a gas exit end of the substrate tube 7. The lower end of the tube 1 is inserted through the inner cylinder 14. Power is supplied to the cavity by a microwave generator 15 so as to establish a plasma within the space 9. A waveguide tube 16 of circular cross-section is also positioned round the substrate tube 7, extending from the microwave cavity. The tube 16 is surrounded by a tubular electrical furnace 17.

Above the perforated lower region of the dispenser tube 3, there is a bulb 5 into which the top end of this lower region protrudes. A quantity of a rare earth halide 1 is held within the bulb 5 around the protruding end of the tube and, in use of the apparatus, it is arranged to be vaporized by the heat from the furnace 17. The temperature gradient of the furnace is such that the vaporized rare earth halide travels down the dispenser tube 3 with the carrier gas and reactant vapour and passes through the perforations 11 into the reaction zone 9. There the reactants (now including the rare earth halide) react with the carrier gas to form a deposit 19 on the interior wall of the substrate tube 7.

Figure 2:
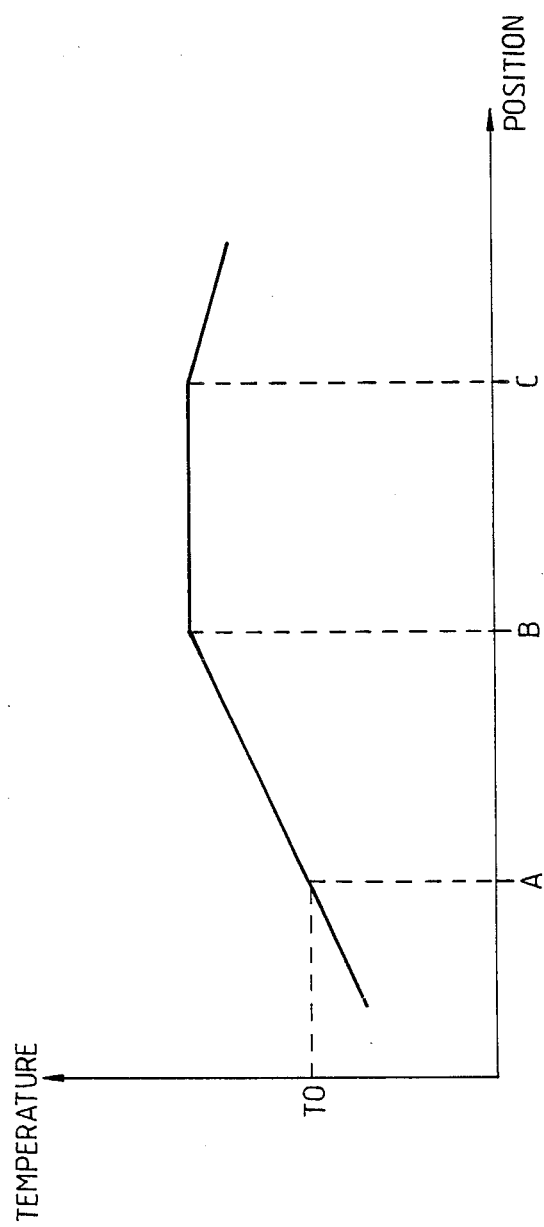
FIG. 2 shows the temperature gradient along the dispenser tube.

Referring to FIG. 2, the temperature of the dispenser tube over its whole length is shown. If $T_o$ is the vaporization temperature of the dopant, the bulb may be placed at any position between A and B. As the temperature gradient from A to B is positive, the vaporized dopant will not condense on the walls of the dispenser tube. The region between B and C is the reaction zone. Here, the temperature is kept constant so as to ensure a uniform deposited layer on the substrate tube.

Figure 3:
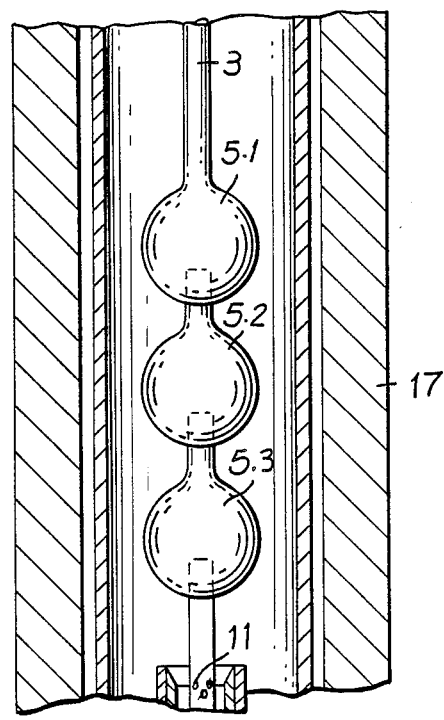
FIG. 3 shows part of a modified form of the apparatus shown in FIG. 1.

A plurality of bulbs 5.1, 5.2, 5.3 may be disposed in series in the non-perforated region of the dispenser tube 3, as illustrated in FIG. 3. In this way, the preform can be simultaneously doped with substances of different vaporization temperatures by placing each dopant substance in a bulb whose temperature is sufficient to cause evaporation, the temperature gradient of the furnace 17 being such that the temperature of the dispenser tube rises progressively from the reservoir 5.1 furthest from the perforated region, to the perforations 11.

We claim:

1. Apparatus for the manufacture of optical fibre preforms by a vapor deposition process, comprising: a dispenser tube, which is perforated along a region adjacent one end; a reservoir for containing at least one dopant substance disposed along a section of the dispenser tube spaced from said perforated region; heating means surrounding the reservoir and a part of the dispenser tube between the reservoir and the perforated region, for heating the reservoir to a temperature sufficient to cause the at least one substance contained therein to be evaporated, and for heating said part of the dispenser tube in a manner to cause its temperature to rise progressively between the reservoir and the perforated region; and means feeding a carrier gas into the dispenser tube to cause the vapor produced by heating the reservoir to pass along the dispenser tube and emerge from the perforated region.

2. Apparatus according to claim 1, wherein the reservoir is a bulb formed in a non-perforated region of the tube.

3. Apparatus according to claim 2, wherein the non-perforated region is formed of two sections of glass tubing, the first section having a bulb which is open to receive a second section which protrudes into the bulb.

4. Apparatus according to claim 1, wherein a plurality of said reservoirs are arranged in series in a non-perforated region of the tube.

5. Apparatus according to claim 4, wherein the temperature of the tube rises progressively from the reservoir furthest from the perforated region, to the perforated region.

6. Apparatus for manufacturing optical fibre preforms by vapor deposition on a substrate, comprising:
reservoir means for containing a vaporizable dopant substance;
a dispenser tube extending from an inlet along a flow path through the reservoir means to a perforated outlet region, said dispenser tube having an elongated intermediate tubular part between the reservoir means and the perforated outlet region;
heating means in thermal communication with the reservoir for vaporizing the dopant substance into a dopant vapor, and also being in thermal communication with the intermediate tubular part for heating the same along its elongation with a temperature gradient that progressively increases along the flow path from the reservoir to the perforated outlet region to prevent condensation of the dopant vapor within the dispenser tube; and
means for feeding a carrier gas into the inlet and along the flow path to entrain the dopant vapor prior to discharge from the perforated outlet region to form a dopant vapor deposit on the substrate.

7. Apparatus according to claim 6, wherein the reservoir means includes a plurality of bulbs arranged successively along the flow path upstream of the perforated outlet region, each bulb containing respective dopant substances that are vaporizable at respective different temperatures, and wherein the heating means heats the bulbs to the different temperatures to vaporize the dopant substances therein.

8. Apparatus according to claim 7, wherein the different vaporizable temperatures of the dopant substances in the bulbs increase in temperature along the flow path.

9. Apparatus according to claim 6, wherein the heating means heats the entire perforated outlet region at a uniform temperature to obtain a uniform deposit on the substrate.

10. Apparatus according to claim 9, wherein the substrate is tubular and surrounds the perforated outlet region with an annular spacing which constitutes a reaction zone; and further comprising means for establishing a plasma within the reaction zone.

11. Apparatus according to claim 6, wherein the dopant substance is a rare earth halide.

12. Apparatus according to claim 6, wherein the temperature gradient increases linearly along the flow path from the reservoir to the perforated outlet region.

* * * * *